United States Patent
Yakishyn et al.

(10) Patent No.: US 10,542,309 B2
(45) Date of Patent: Jan. 21, 2020

(54) ELECTRONIC DEVICE AND OPERATION METHOD THEREOF

(71) Applicant: Samsung Electronics Co., Ltd, Gyeonggi-do (KR)

(72) Inventors: Yevgen Yakishyn, Kiyv (UA); Oleksandr Radomskyi, Kharkov (UA); Oleksandr Shchur, Kiyv (UA); Aleksandra Peteichuk, Tiachivskyi region (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/854,510

(22) Filed: Dec. 26, 2017

(65) Prior Publication Data

US 2018/0184148 A1 Jun. 28, 2018

(30) Foreign Application Priority Data

Dec. 26, 2016 (KR) .................. 10-2016-0179312

(51) Int. Cl.
| | |
|---|---|
| *H04N 21/433* | (2011.01) |
| *G11B 27/031* | (2006.01) |
| *G06F 16/783* | (2019.01) |
| *H04N 21/262* | (2011.01) |
| *H04N 21/482* | (2011.01) |

(52) U.S. Cl.
CPC ..... *H04N 21/26258* (2013.01); *G06F 16/783* (2019.01); *G11B 27/031* (2013.01); *H04N 21/433* (2013.01); *H04N 21/4825* (2013.01); *H04N 21/4828* (2013.01)

(58) Field of Classification Search
CPC ......... H04N 21/26258; H04N 21/4333; H04N 21/4825; H04N 21/4828; G06F 17/30784; G11B 27/031

See application file for complete search history.

(56) References Cited

U.S. PATENT DOCUMENTS

| | | | |
|---|---|---|---|
| 9,036,000 B1 | 5/2015 | Ogale et al. | |
| 2004/0004659 A1* | 1/2004 | Foote | H04N 5/262 |
| | | | 348/36 |
| 2004/0098175 A1 | 5/2004 | Said et al. | |
| 2006/0271287 A1 | 11/2006 | Gold et al. | |
| 2007/0070069 A1 | 3/2007 | Samarasekera et al. | |
| 2008/0266142 A1 | 10/2008 | Sula et al. | |
| 2009/0276151 A1 | 11/2009 | Bucchieri | |
| 2013/0116968 A1* | 5/2013 | Wirola | G01S 5/0252 |
| | | | 702/150 |

(Continued)

FOREIGN PATENT DOCUMENTS

| | | |
|---|---|---|
| EP | 2518693 A2 | 10/2012 |
| KR | 10-2000-0054438 A | 9/2000 |

(Continued)

OTHER PUBLICATIONS

ISA/KR, "International Search Report and Written Opinion of the International Searching Authority," International Application No. PCT/KR2017/015439, dated Apr. 18, 2018, 10 pages.

(Continued)

*Primary Examiner* — Thai Q Tran
*Assistant Examiner* — Jose M Mesa

(57) ABSTRACT

A method of operating an electronic device comprises obtaining a search path. The method also comprises obtaining at least one video content related to the search path and determining intersection points between the at least one video content. The method also comprises extracting parts of the at least one video content corresponding to the search path by using the intersection points and generating video content of the search path by stitching the extracted parts together.

20 Claims, 13 Drawing Sheets

(56) References Cited

U.S. PATENT DOCUMENTS

2016/0003635 A1     1/2016   Jung et al.
2017/0092326 A1     3/2017   Bostick et al.

FOREIGN PATENT DOCUMENTS

| KR | 10-2006-0068205 A | 6/2006 |
|----|-------------------|--------|
| KR | 10-2012-0107317 A | 10/2012 |
| KR | 10-1462583 B1 | 11/2014 |
| KR | 10-2015-0123650 A | 11/2015 |

OTHER PUBLICATIONS

David Lowe, "Demo Software: SIFT Keypoint Detector", Jul. 2005, 1 page.
"VLFeat.org", 2007-13, 1 page.
"Project Goals", LadyPackWiki, May 14, 2007, 1 page.
"SURF: speeded up robust features", 1 page.
Gonzalo Vaca-Castano et al., "City Scale Geo-Spatial Trajectory Estimation of a Moving Camera", 2012, 8 pages.
Shervin Ardeshir et al., "GIS-Assisted Object Detection and Geospatial Localization", 2014, 16 pages.
Asaad Hakeem et al., "Estimating Geospatial Trajectory of a Moving Camera", Aug. 20-24, 2006, 6 pages.
"www.microsoft.com/en-us/research", 3 pages.
Ferran Diego et al., "Vehicle Geolocalization based on video synchronization", 2010, 6 pages.
Amir Roshan Zamir et al., "Accurate Image Localization Based on Google Maps Street View1", 2010, 14 pages.
Supplementary European Search Report dated Sep. 19, 2019 in connection with European Patent Application No. 17 88 8391, 8 pages.

\* cited by examiner

ELECTRONIC DEVICE AND OPERATION METHOD THEREOF

CROSS-REFERENCE TO RELATED APPLICATION

This application is related to and claims priority to Korean Patent Application No. 10-2016-0179312 filed on Dec. 26, 2016, the disclosure of which is incorporated herein in its entirety by reference.

TECHNICAL FIELD

The present disclosure relates to electronic devices and operation methods thereof, and more particularly, to electronic devices for generating video content regarding a search path and operation methods of the electronic devices.

BACKGROUND

With the development of multimedia and network related technologies, a large amount of video content is generated and shared among multiple users. In particular, with the development of virtual reality technology, the amount of 360 degree video content is dramatically increasing.

Generally, users who do not have a specific purpose and simply generate video content do so without considering how the video content will be used. Thus, generally generated video content is often not suitable for content consumers. More specifically, the majority of video content does not include information related to photographing positions of the video content. Such video content is not suitable for content consumers who need video content related to a specific position.

Accordingly, if it is possible to analyze general video content and obtain information related to photographing positions of the video content, utilization of the video content may be increased. In particular, in the case of virtual reality that may improve user experience compared to the existing technology, various services may be provided using 360 degree video content, based on the obtained information.

SUMMARY

To address the above-discussed deficiencies, it is a primary object to provide electronic devices for generating video content regarding a search path and operation methods of the electronic devices.

Additional aspects will be set forth in part in the description which follows and, in part, will be apparent from the description, or may be learned by practice of the presented embodiments.

According to an aspect of an embodiment, a method of operating an electronic device comprises obtaining a search path; obtaining at least one video content related to the search path; determining intersection points between the at least one video content; extracting parts of the at least one video content corresponding to the search path by using the intersection points; and generating video content of the search path by stitching the extracted parts together.

According to an aspect of another embodiment, an electronic device comprises a memory configured to store a program for an operation of the electronic device; and a processor configured to obtain a search path, obtain at least one video content related to the search path, determine intersection points between the at least one video content, extract parts of the at least one video content corresponding to the search path by using the intersection points, and generate video content of the search path by stitching the extracted parts together by executing the program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present specification, when a configuration is referred to as being "connected" with another configuration, it includes not only a case of being directly connected, but also a case of being connected with another configuration in between. Also, when an element is referred to as "including" another element, it is to be understood that the element may include other elements as well as other elements.

Figure 1:
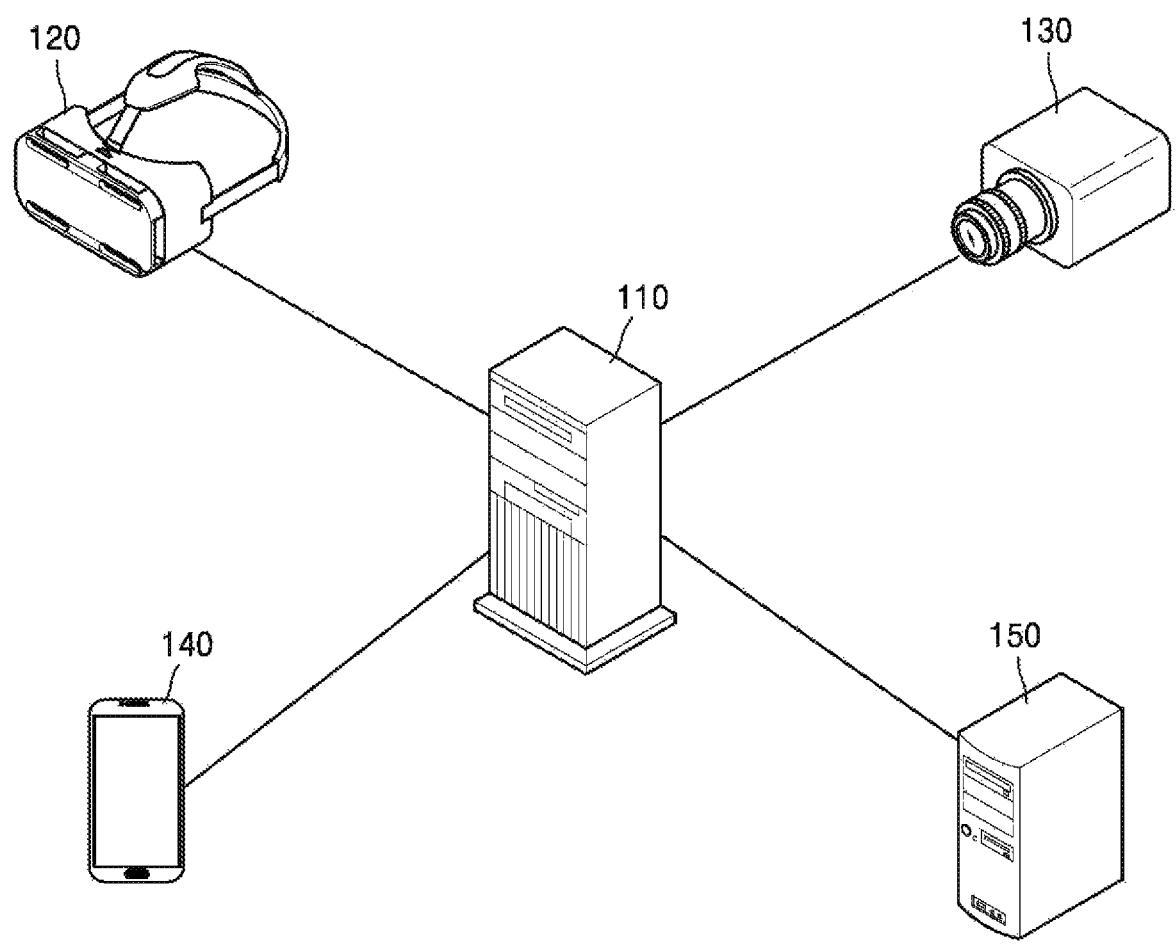
FIG. 1 illustrates a diagram of an example of a system using an electronic device, according to an embodiment.

FIG. 1 illustrates a diagram of an example of a system using an electronic device according to an embodiment.

Referring to FIG. 1, the system using the electronic device according to an embodiment may include a server 110 and devices 120, 130, 140, and 150 connected to the server 110.

The server 110 provides services to at least some of the devices 120, 130, 140, and 150 connected to the server 110. In an embodiment, the server 110 receives and stores video content from at least some of the electronic devices 120, 130, 140, and 150 connected to the server 110. At this time, the video content received by the server 110 may be video content photographed by at least some of the electronic devices 120, 130, 140 and 150 connected to the server 110. The video content received by the server 110 may be video content received from at least some of the electronic devices 120, 130, 140 and 150 connected to the server 110. The server 110 may provide a service transmitting the video content when there is a request for downloading video content from at least some of the electronic devices 120, 130, 140, and 150 connected to the server 110.

Also, the server 110 may combine at least one video content to generate new video content that a user needs. The server 110 may transmit the generated new video content to the devices 120, 130, 140, and 150 connected to the server 110.

The devices 120, 130, 140, and 150 connected to the server 110 include a device 120 displaying video content, a device 130 generating video content using a camera, a device 140 that may display content and generate video content, and a device 150 storing video content.

The device 120 displaying video content may be a device including a display such as a head-mounted display, a TV, a PC, and the like. If the video content is 360 degree video content, the device 120 displaying video content may be a device that supports a display of the 360 degree video content. Also, the device 120 displaying video content may combine at least one video content to generate and display new video content that the user needs. Furthermore, the device 120 displaying video content may receive new video content, from an external device such as the server 110, generated to combine at least one video content and match with a search path of the user and may display the new video content.

The device 130 generating video content using the camera may include a digital camera, a web cam, a 360 degree camera, and the like. Also, when the video content is the 360 degree video content, the device 130 generating video content using the camera may be a device supporting 360 degree photographing or 360 degree image synthesis.

The device 140 that may display video content and generate new video content may include a smart phone, a tablet PC, a notebook, and the like. Such a device may include both a camera and a display. In general, an electronic device may perform various functions, rather than performing one function. Thus, the device 120 displaying video content may generate video content, and the device 130 generating video content using the camera may display video content. For example, a camera may be included in a head-mounted display to generate video content, or a display may be included in a digital camera to display video content.

The device 150 storing video content receives and stores video content created in another device. The device 150 storing video content may be a server. Also, the device 150 storing video content may be a dedicated device for storing video content, or may be a device including other functions together as described above. For example, the device 150 storing video content may combine at least one video content among stored video content to generate new video content used by the user, and transmit the generated new video content to the server 110 or to the devices 120, 130, 140, and 150 connected to the server 110.

The system shown in FIG. 1 is merely an example, and the electronic device may be utilized variously. For example, the electronic device may not be connected to the server 110, and may generate video content on its own, and may process and display the generated video content.

Figure 2:
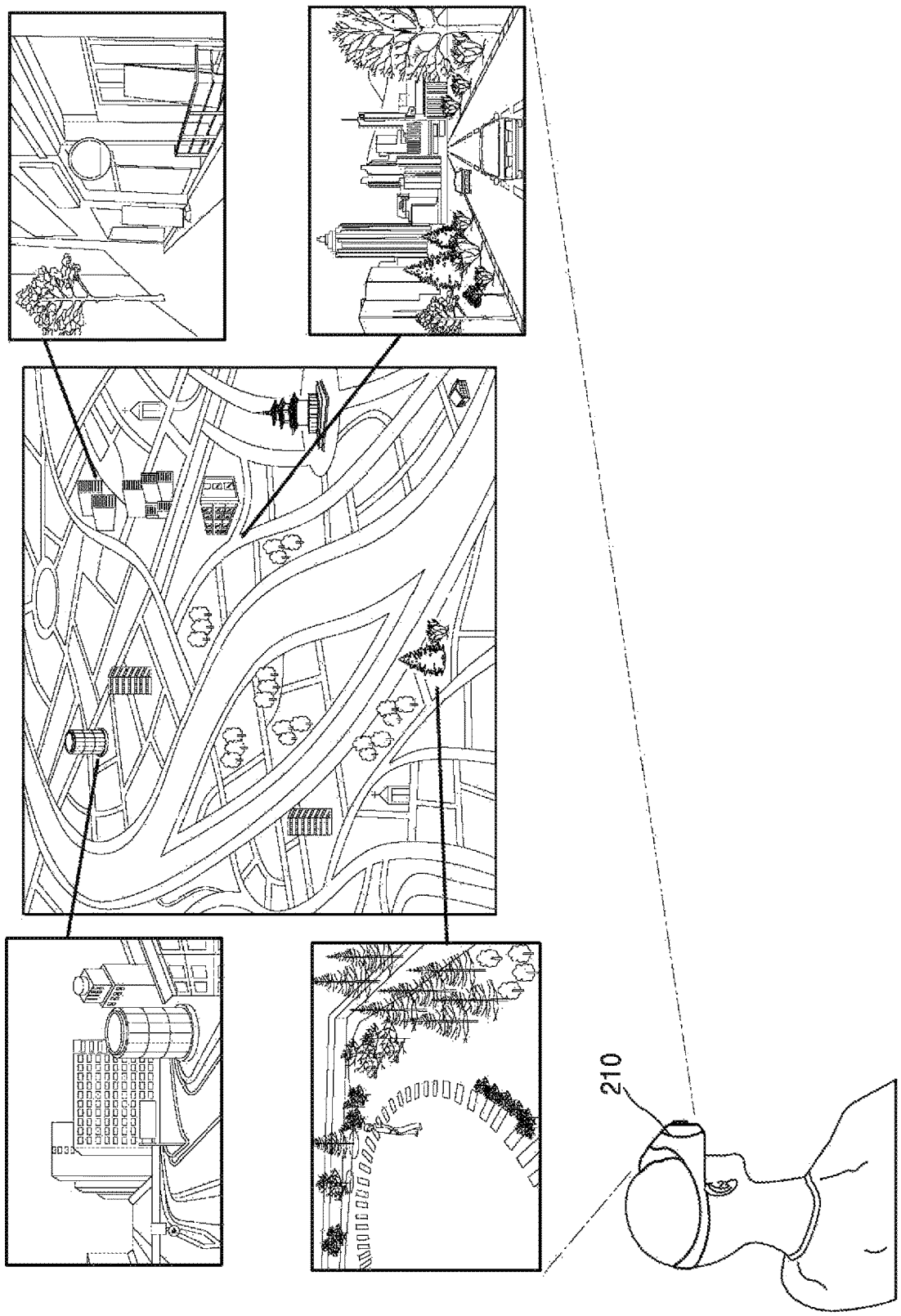
FIG. 2 illustrates a diagram of an example in which the system of FIG. 1 uses an electronic device.

FIG. 2 illustrates a diagram of an example in which a system of FIG. 1 uses an electronic device.

In FIG. 2, a head-mounted display 210 is used as an example of the electronic device. Referring to FIG. 2, the head-mounted display 210 may display a search path of a user on a virtual reality.

In an embodiment, content displayed on the head-mounted display 210 may be generated from at least one video content. If there is video content matching with the search path of the user, the search path may be displayed on the virtual reality using the video content. However, in general, it is difficult to find perfectly matching video content that a content consumer needs. Accordingly, the head-mounted display 210 may combine at least one video content to generate and display new video content that matches with the search path of the user. Alternatively, the head-mounted display 210 may receive new video content, from an external device such as the server 110, generated to combine at least one video content and match with the search path of the user and may display the new video content.

According to an embodiment, even when there is no video content matching with the search path of the user, existing video content may be combined to generate new video content matching with the search path of the user. Accordingly, it is possible to increase utilization of the existing video content and to provide video content used by the user.

Figure 3:
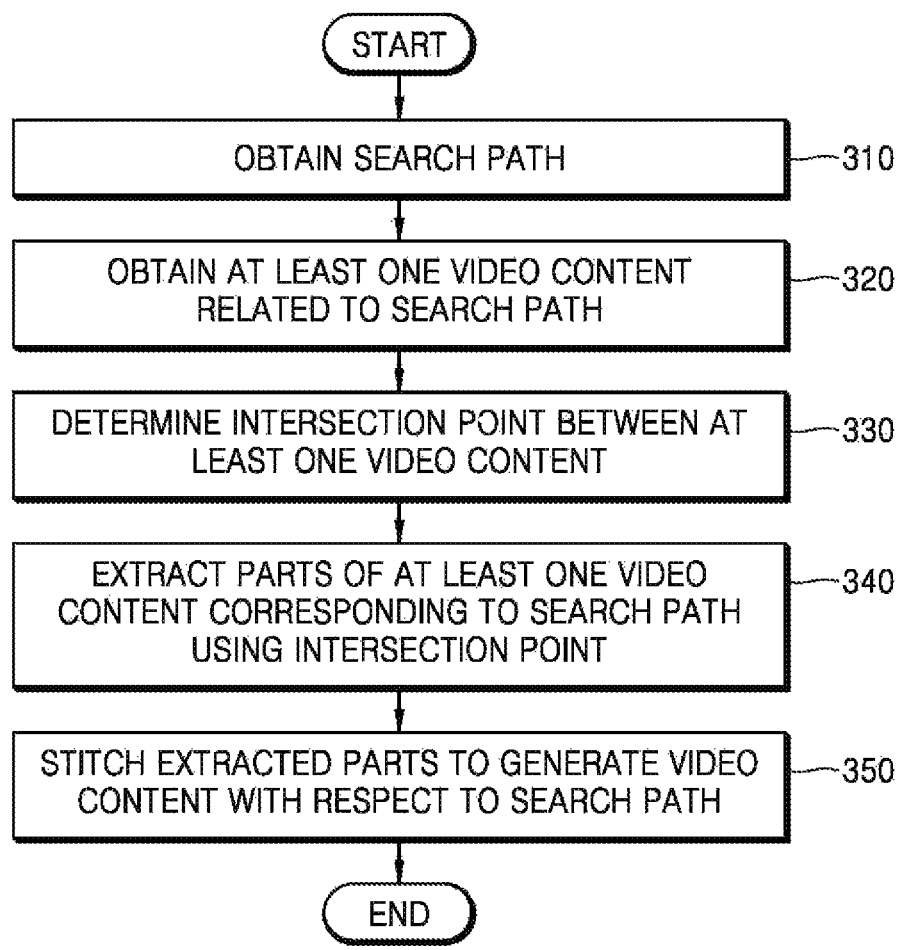
FIG. 3 illustrates a flowchart of a method of operating an electronic device, according to an embodiment.

FIG. 3 illustrates a flowchart of a method of operating an electronic device according to an embodiment.

First, in operation 310, the electronic device obtains a search path of a user. In an embodiment, the electronic device may receive a user input to obtain the search path. The electronic device may also obtain the search path from another device. In an embodiment, the user may set a particular building or a particular floor as the search path for an indoor search. In this case, the electronic device may set the building or the floor itself as the search path.

Furthermore, the electronic device may set a region around the search path as a region of interest. The region of interest may then be used to obtain video content related to the search path at a later stage. This will be described with reference to FIGS. 4 and 5.

Figure 4:
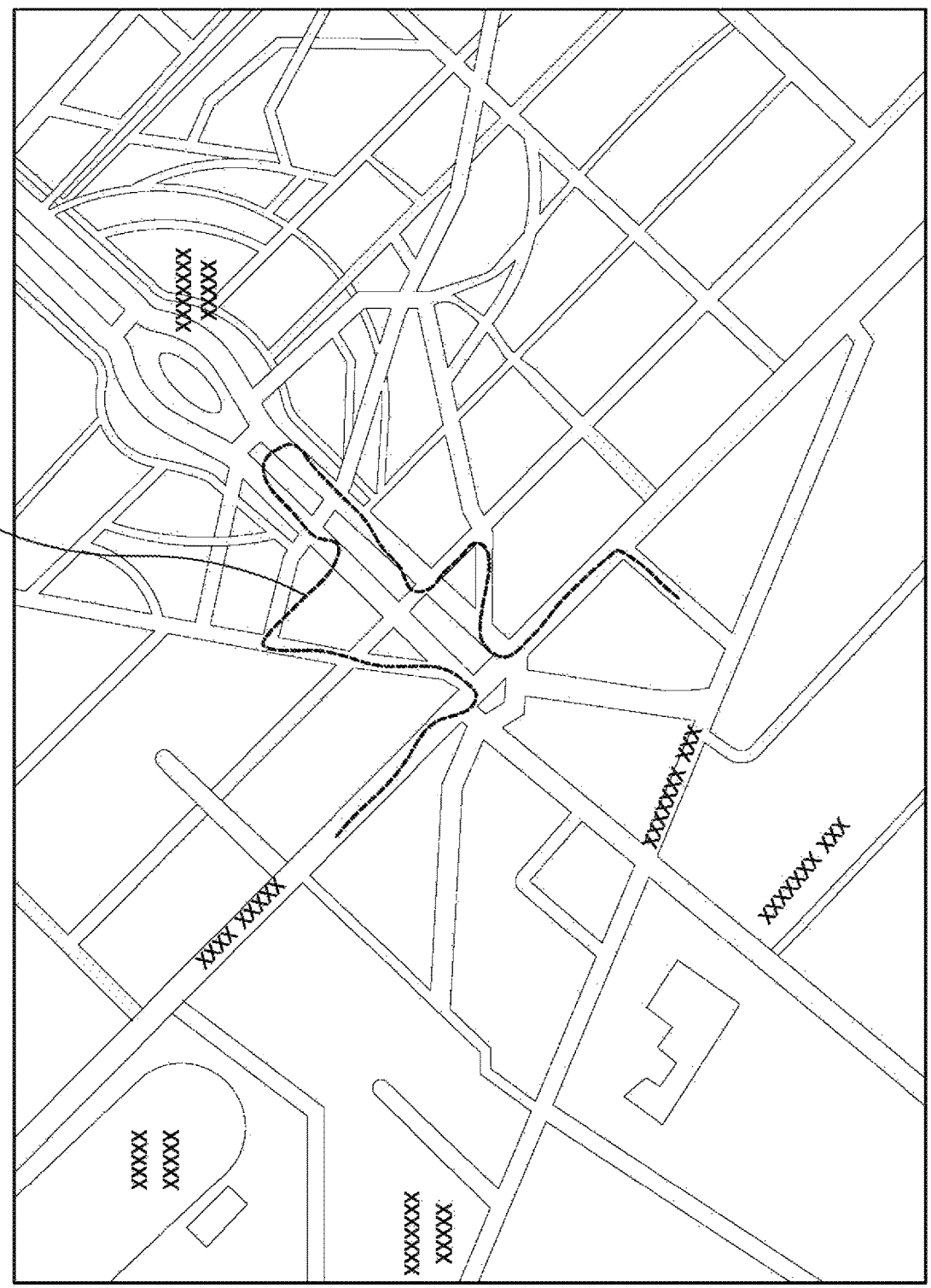
FIG. 4 illustrates a diagram of a process of obtaining a search path, according to an embodiment.
Figure 5:
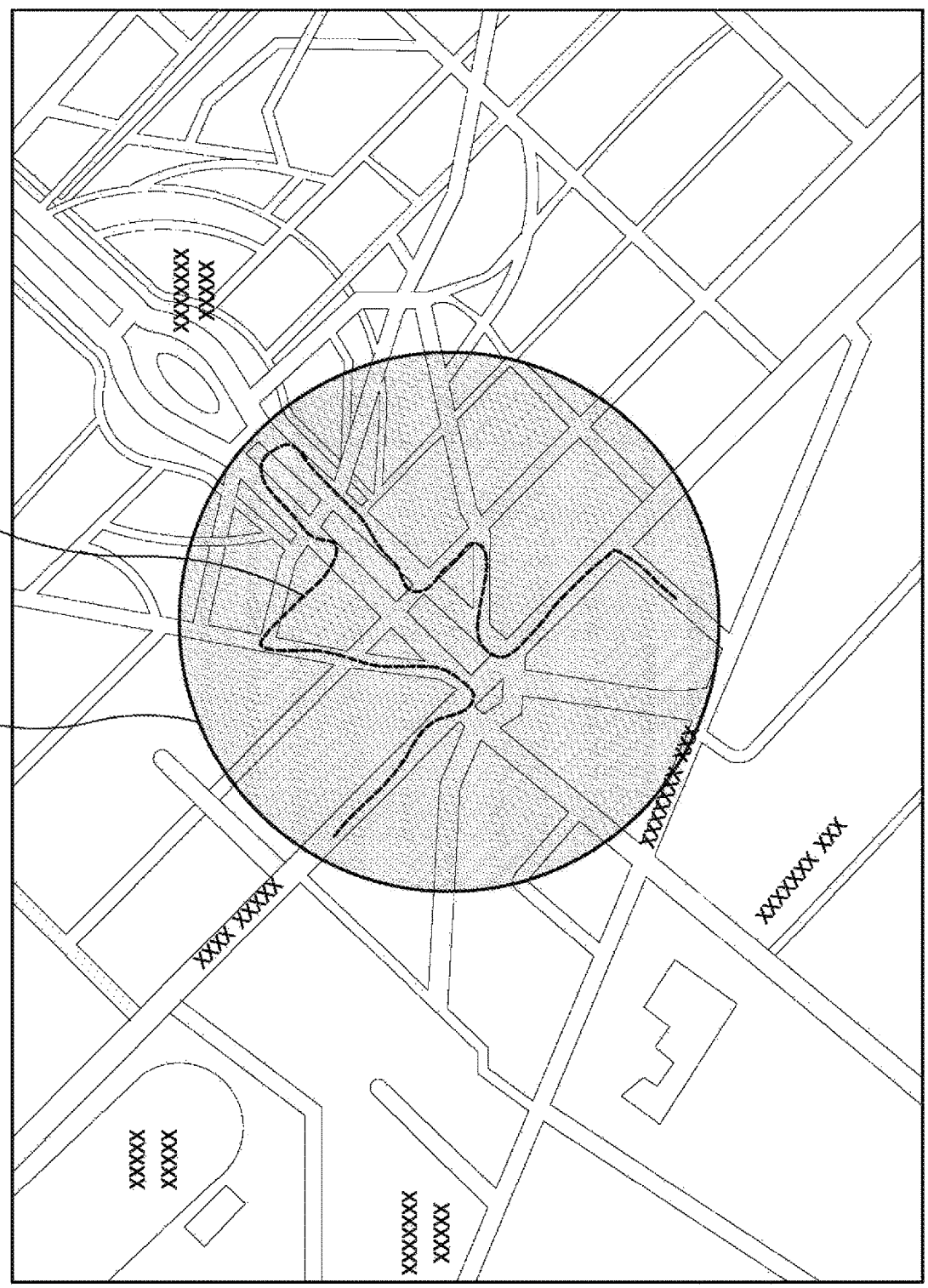
FIG. 5 illustrates a diagram of a process of setting a region of interest, according to an embodiment.

FIG. 4 illustrates a diagram of a process of obtaining a search path 410 according to an embodiment. FIG. 5 illustrates a diagram explaining a process of setting a region of interest 510 according to an embodiment.

Referring to FIG. 4, the search path 410 may be displayed on a map.

When an electronic device receives a user input directly and obtains the search path 410, the electronic device may receive a departure and a destination from a user. The electronic device may receive a path between the departure and the destination directly from the user. Alternatively, when the user inputs the departure and the destination, the electronic device may search at least one possible path between the departure and the destination and provide the path to the user, and obtain the search path 410 according to a selection of the user. Alternatively, the electronic device may automatically select one of the possible paths between the departure and destination, for example, an optimal path when the user inputs the departure and the destination. The electronic device may also obtain the search path 410 by receiving information about the search path 410 from another device.

Further, the user may set a specific building or a specific floor as the search path 410 for an indoor search. In this case, the electronic device may set the specific building or the specific floor itself as the search path 410, instead of receiving the departure and the destination.

Referring to FIG. 5, the electronic device may set the region of interest 510 as a region around the search path 410. In a later operation, the electronic device may obtain video content including the region of interest 510 of the video content.

Referring again to the description of FIG. 3, in operation 320, the electronic device obtains at least one video content related to the search path. In an embodiment, the electronic device may obtain video content acquired by photographing at least a part of the search path. At this time, the video content may be 360 degree video content.

In an embodiment, the electronic device may receive at least one video content related to the search path from an external device, such as a server. The electronic device may store the video content received from the external device, such as the server, and may generate and store video content therein. In an embodiment, the electronic device is also capable of loading the video content stored therein.

In an embodiment, whether the video content are related to the search path may be determined through additional information related to the video content. The additional information may include a title of the video content, photographing position information, a hash tag, index information, summary information, and the like. The electronic device may use the additional information to determine whether the video content are related to the search path among video content stored in the electronic device or the external device such as the server. This will be described with reference to FIG. 6.

Figure 6:
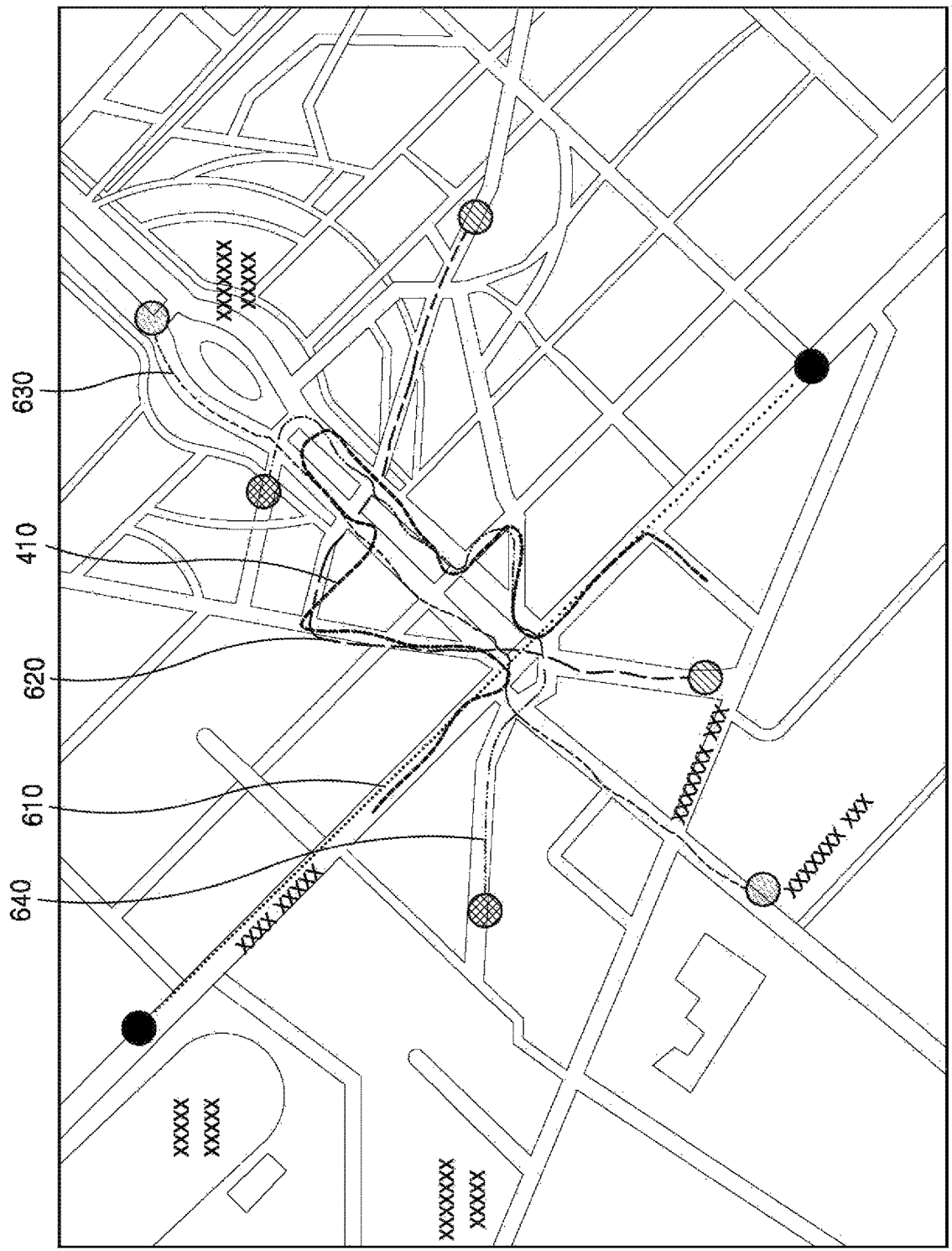
FIG. 6 illustrates a diagram of video content related to a search path, according to an embodiment.

FIG. 6 illustrates a diagram of video content related to a search path according to an embodiment.

FIG. 6 illustrates photographing paths 610, 620, 630, and 640 of the video content related to the search path photographed around the search path 410 or the region of interest 510 shown in FIG. 4 or 5. An electronic device determines whether the video content is related to the search path using additional information of the video content. However, the photographing paths 610, 620, 630, and 640 of the video content related to the search path shown in FIG. 6 are determined through the additional information related to the video content, and a method of obtaining a photographing path of actual video content will be described below again.

In an embodiment, the electronic device may determine that the video content is video content related to the search path 410 if the video content is video content obtained by photographing at least a part of the search path 410.

Returning to the description of FIG. 3 again, in operation 330, the electronic device may determine an intersection point between the at least one video content. In an embodiment, the electronic device may obtain a photographing path of the at least one video content and overlay the photographing path of the at least one video content to determine the intersection point.

In an embodiment, when the search path is located outdoors, the electronic device may obtain the photographing path based on additional information of the at least one video content including a photographing position. Furthermore, the electronic device may also analyze the video content to obtain the photographing path. This will be described with reference to FIGS. 7 to 11.

Figure 7:
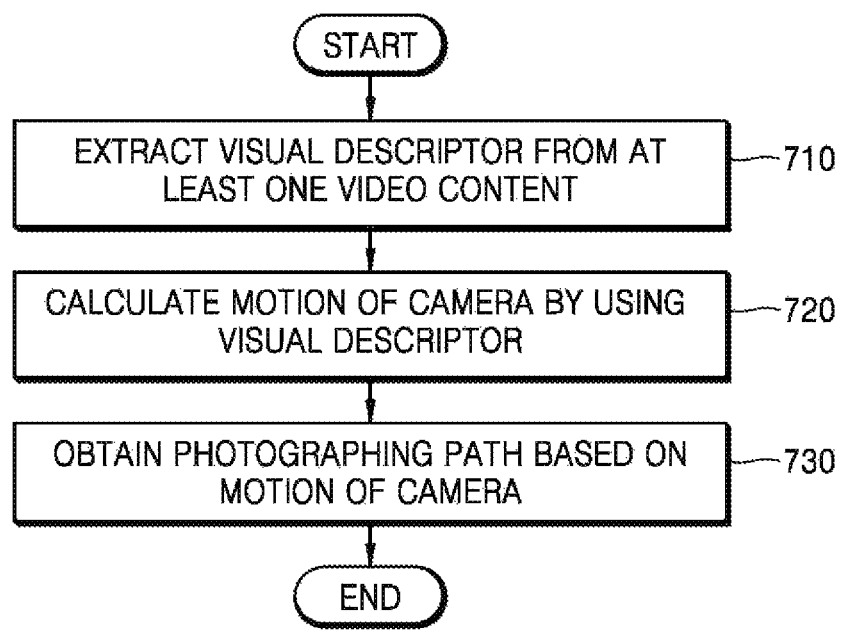
FIG. 7 illustrates a flowchart of a method of obtaining a photographing path of video content of an electronic device, according to an embodiment.

FIG. 7 illustrates a flowchart of a method of obtaining a photographing path of video content of an electronic device according to an embodiment.

Referring to FIG. 7, first, in operation 710, an electronic device extracts a visual descriptor from at least one video content. The visual descriptor is an object located on a search path used to obtain the search path and may be identified based on features such as color, texture, shape, motion, position, etc. Examples of the visual descriptor include road signs, buildings, traffic lights, street lights, billboards, cars, furniture, pictures, photographs, room doors, windows, etc. This will be described in more detail with reference to FIGS. 8 and 9.

Figure 8:
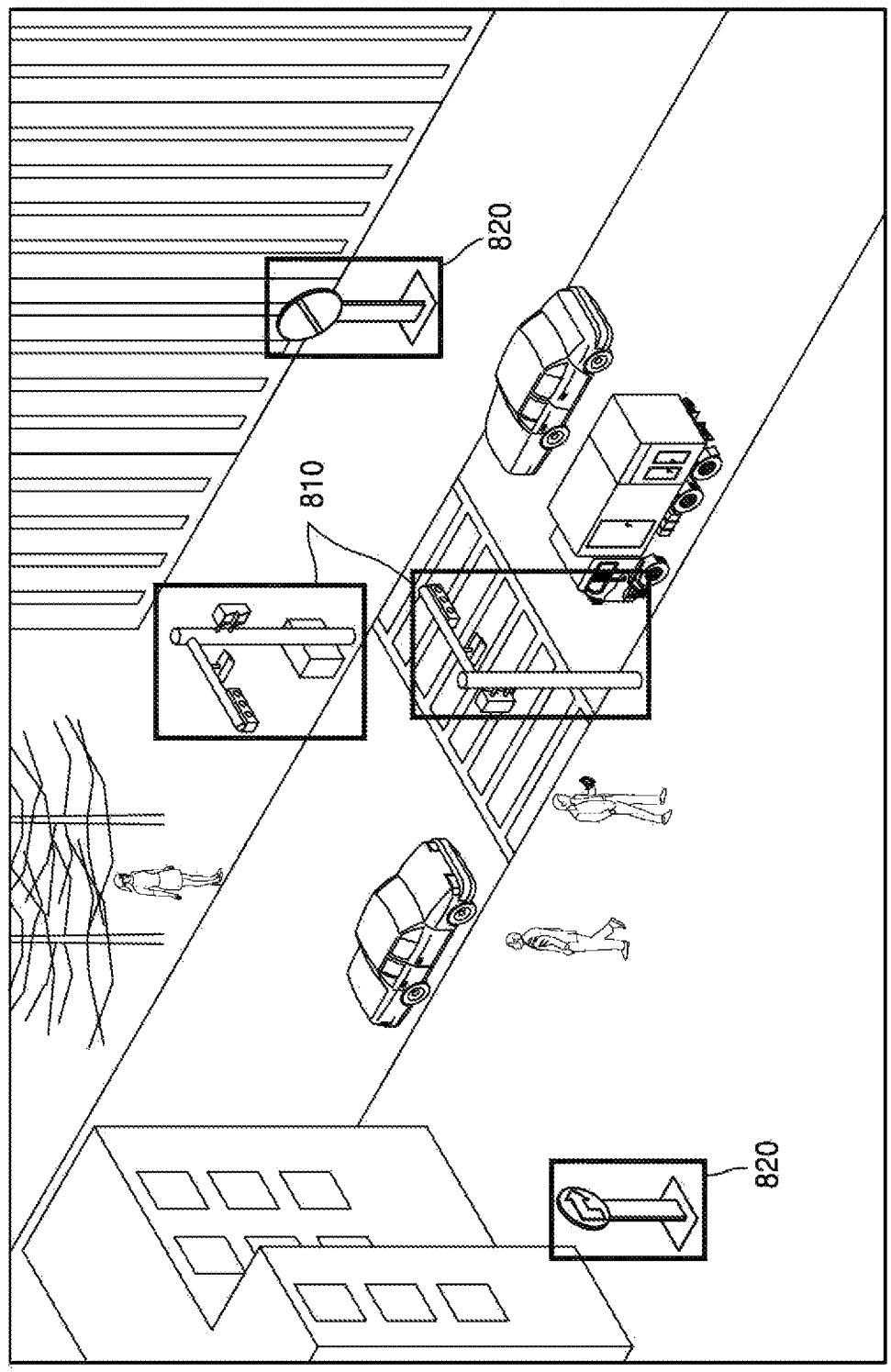
FIG. 8 illustrates a diagram of an example of a visual descriptor.
Figure 9:
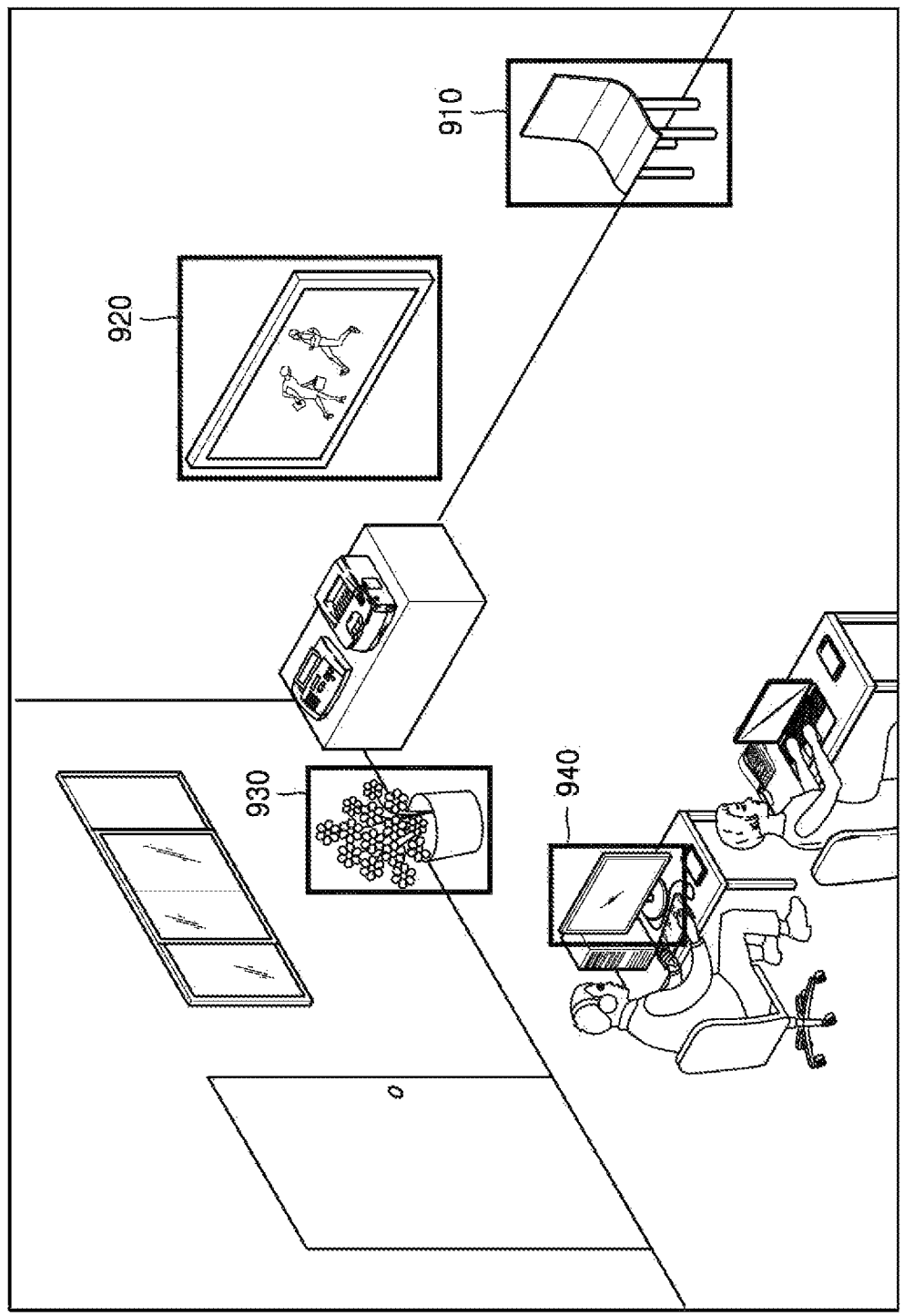
FIG. 9 illustrates a diagram of another example of a visual descriptor.

FIG. 8 illustrates a diagram of an example of a visual descriptor. FIG. 9 illustrates a diagram of another example of a visual descriptor.

FIG. 8 illustrates a diagram of the visual descriptor that may be used outdoors. Referring to FIG. 8, a signal lamp 810, a signboard 820, and the like are used as visual descriptors. FIG. 9 illustrates a diagram of the visual descriptor that may be used indoors. Referring to FIG. 9, a chair 910, a TV 920, a flower pot 930, a monitor 940, and the like are used as visual descriptors.

Referring again to the description of FIG. 7, in operation 720, the electronic device calculates a motion of a camera by using a visual descriptor. As the camera moves, since a viewpoint of an object changes, the motion of the camera may be calculated using the viewpoint. In other words, when the descriptor is photographed while the camera moves, since a shape, a size, a direction, etc. of the descriptor photographed by the camera change according to the motion of the camera, the motion of the camera may be calculated using the descriptor.

In an embodiment, the electronic device may analyze video content in a frame unit and analyze a change of the descriptor in an adjacent frame to calculate the motion of the camera. More specifically, the electronic device analyzes the descriptor for each frame to calculate a position of the camera. Thereafter, the motion of the camera may be calculated by continuously connecting positions of the camera calculated for each frame.

The motion of the camera may be represented by a 3D-based coordinate system such as a Cartesian coordinate system. The electronic device may also calculate the motion of the camera by using a triangulation approach.

Thereafter, in operation 730, the electronic device may obtain a photographing path based on the motion of the camera. In an embodiment, the electronic device may analyze a track of the motion of the camera to obtain a photographic path. This will be described with reference to FIG. 10.

Figure 10:
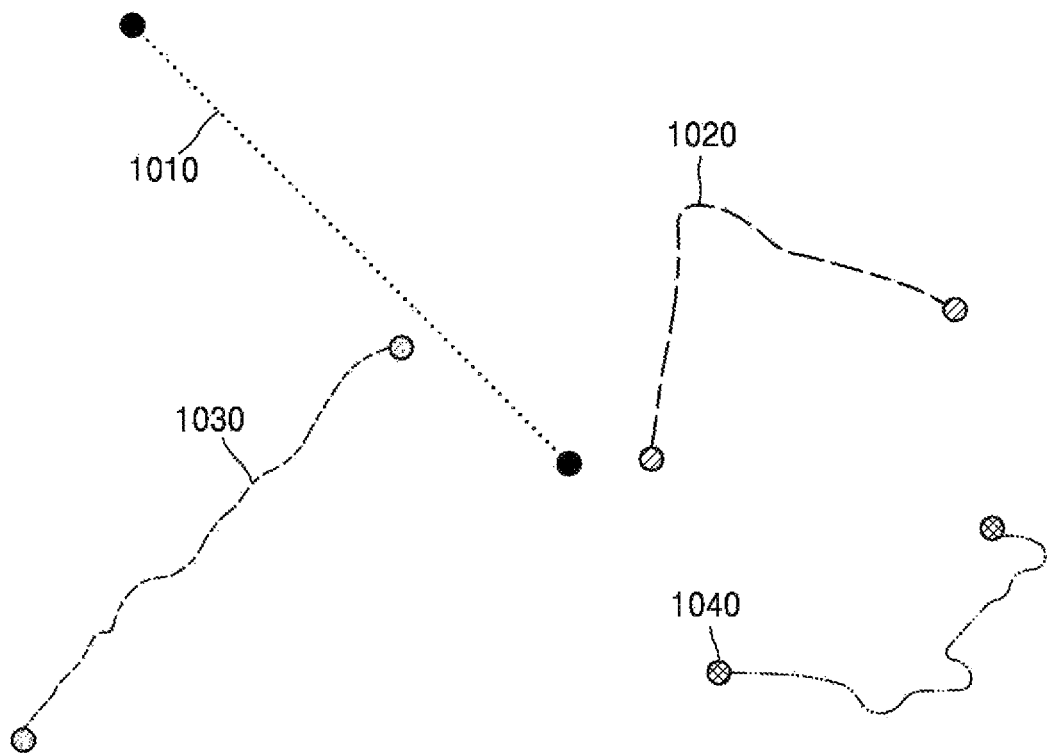
FIG. 10 illustrates a diagram of obtained photographing paths of video content, according to an embodiment.

FIG. 10 illustrates a diagram of obtained photographing paths 1010, 1020, 1030, and 1040 of video content according to an embodiment.

Referring to FIG. 10, the photographing paths 1010, 1020, 1030, and 1040 of the video content obtained by using the method of FIG. 7 are illustrated. The photographing paths 1010, 1020, 1030, and 1040 of the video content shown in FIG. 10 are analyzed based on the video content unlike the photographing paths 610, 620, 630, and 640 of video content shown in FIG. 6 and indicate actual photographing paths.

Referring again to the description of FIG. 3, in an embodiment, the electronic device overlay the photographing paths of the video content obtained by using the method described above to determine the intersection point. This will be described with reference to FIG. 11.

Figure 11:
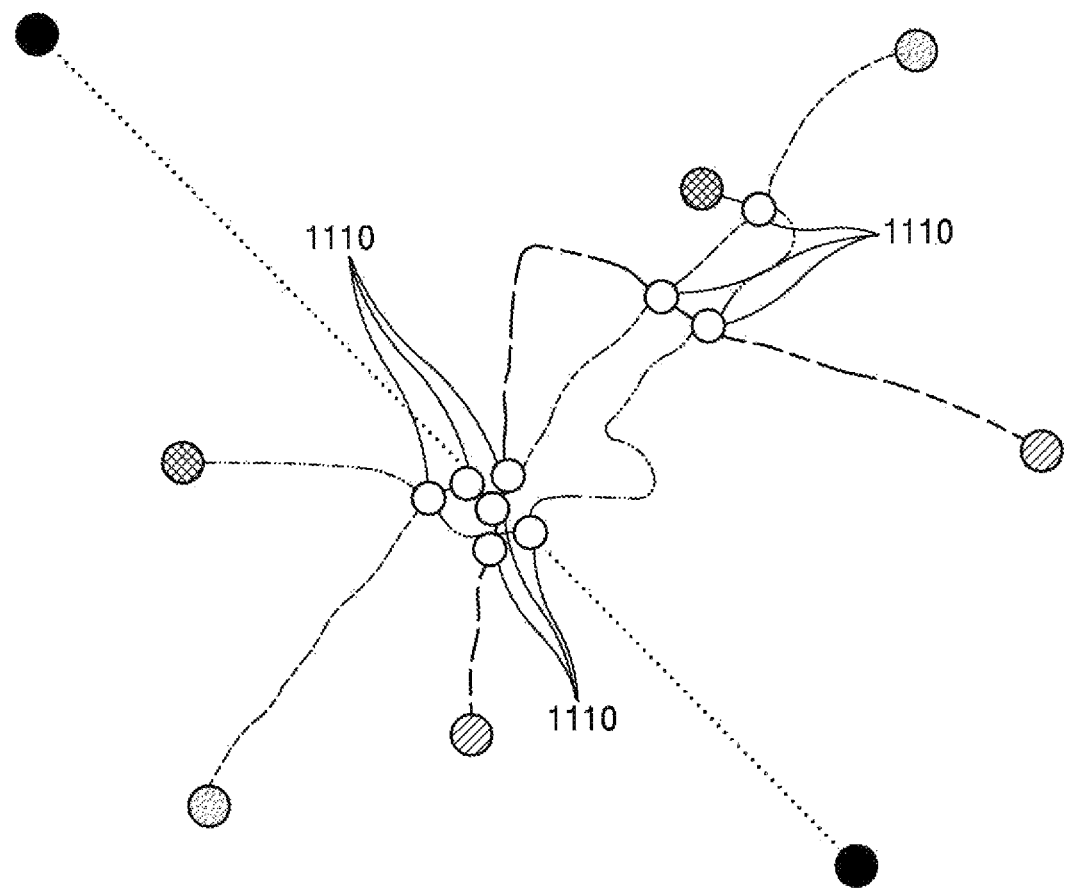
FIG. 11 illustrates a diagram of a process of determining an intersection point between a plurality of pieces of video contents, according to an embodiment.

FIG. 11 illustrates a diagram of a process of determining an intersection point 1110 between a plurality of pieces of video contents according to an embodiment.

Referring to FIG. 11, the electronic device determines the intersection point 1110 between the video contents by overlaying obtained photographing paths of the video contents. A plurality of intersection points may exist. The intersection point 1110 serves as a reference point for extracting and stitching the video contents. In other words, part of each of the video contents may be extracted with respect to the intersection point 1110, and the extracted video contents may be stitched with respect to the intersection point 1110.

Returning to the description of FIG. 3 again, in operation 340, the electronic device extracts parts of the at least one video content corresponding to the search path using the intersection point. In an embodiment, the electronic device may extract intersection points located on the search path and parts corresponding to paths between the intersection points from the at least one of video content. Operation 340 is a process of extracting video content corresponding to the search path. In general, it is difficult to find perfectly matching video content that a content consumer needs. Therefore, parts match with search paths are extracted from multiple pieces of video contents.

In operation 350, the electronic device stitches the extracted parts to generate video content of the search path. The electronic device generated one video content by stitching the parts of the video contents extracted from multiple pieces of video contents. At this time, the parts of the video contents are stitched to each other with respect to the intersection point determined in operation 330. Since the parts of each of the video contents are extracted with respect to the intersection point, a process of stitching the parts is also performed with respect to the intersection point.

In an embodiment, the extracted parts may overlap, and the obtained video contents may have no part corresponding to the photographing path. If there is no part corresponding to the photographing path, the electronic device may further obtain video content through an additional process or generate video content while making the part empty. Also, if the extracted parts overlap, one of parts of multiple pieces of video contents may be selected to stitch parts of the selected video contents.

In an embodiment, the video content generated by the electronic device may be unnatural by extracting and stitching parts of a plurality of pieces of irrelevant video contents. For example, when one video content is photographed daytime and the other is photographed nighttime, if parts of the two pieces of video contents are extracted and stitched, a time change rapidly occurs, which may make a user feel uncomfortable. Accordingly, the electronic device may select parts to be stitched with respect to context information on the extracted parts and stitch the selected parts. Here, the context information may include information such as weather, season, time, a surrounding environment, etc. According to an embodiment, the electronic device may generate more natural video content by selecting parts to be stitched with respect to the context information.

The process of FIG. 3 will be briefly described again with reference to FIG. 12.

Figure 12:
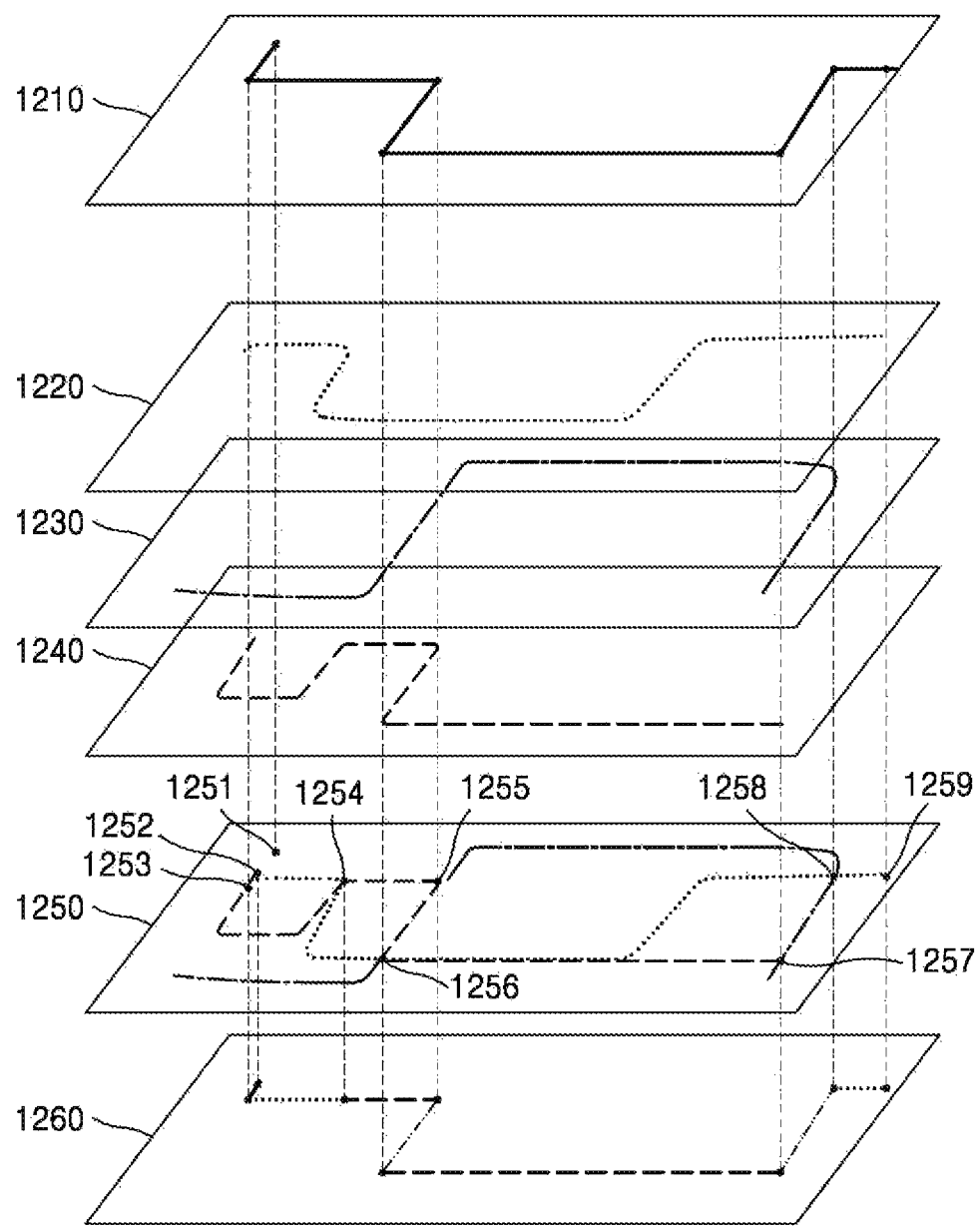
FIG. 12 illustrates a diagram of a process of generating video content, according to an embodiment.

FIG. 12 illustrates a diagram of a process of generating video content according to an embodiment.

Referring to FIG. 12, an electronic device obtains a search path 1210 and obtains three pieces of video contents related to the search path 1210. The electronic device then overlay (1250) photographing paths 1220, 1230, and 1240 with respect to the three pieces of video contents to determine intersection points 1251, 1252, . . . 1259. The electronic device extracts the intersection points 1251, 1252, . . . , 1259 located on the search path 1210 and of the video contents and stitches the extracted parts to generate video content 1260 used by a user.

In FIG. 12, there is no part corresponding to a search path between the intersection points 1251 and 1252. Thus, the electronic device may additionally obtain video content including the part or generate the video content 1260 while making the part empty.

Up to now, a method of operating an electronic device according to an embodiment has been described. Hereinafter, a configuration of the electronic device will be described in more detail. Redundant descriptions with those provided above will be briefly provided.

Figure 13:
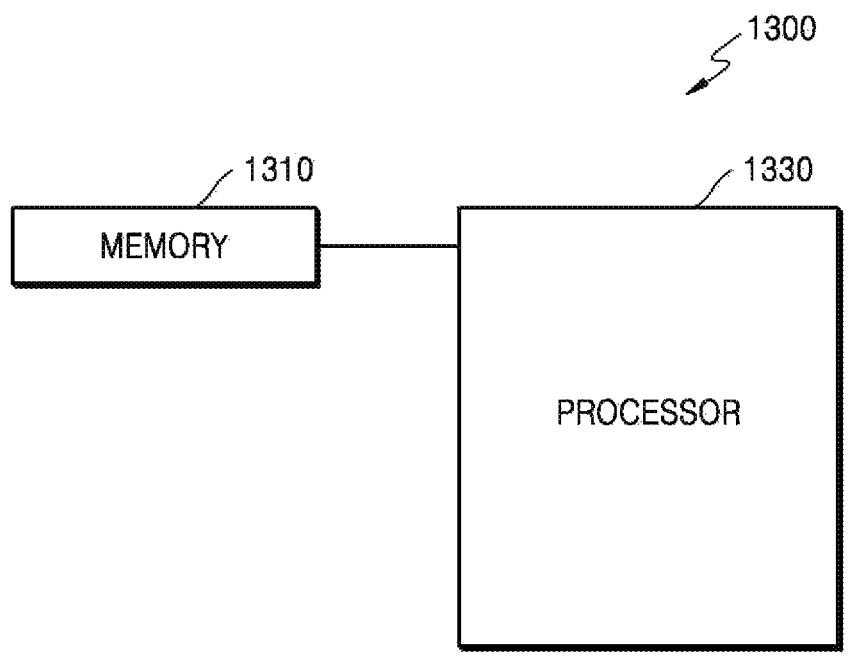
FIG. 13 illustrates a block diagram of a configuration of an electronic device according to an embodiment.

FIG. 13 illustrates a block diagram of a configuration of an electronic device 1300 according to an embodiment.

Referring to FIG. 13, the electronic device 1300 includes a memory 1310 and a processor 1320.

The electronic device 1300 may include a device capable of image processing such as a head-mounted display, a smart phone, a tablet PC, a notebook computer, a server, etc.

Various types of data such as programs and files, such as applications, may be installed and stored in the memory 1310. The processor 1320 may access and use data stored in memory 1310, or may store new data in the memory 1310. The processor 1320 may also execute a program installed in the memory 1310.

In an embodiment, the memory 1310 may store a program for operation of the electronic device 1300.

The processor 1320 controls the overall operation of the electronic device 1300, and in particular, may control the electronic device 1300 to combine at least one video content and generate new video content that a user needs. Also, the processor 1320 may store signals or data input from outside the electronic device 1300, a RAM used as a storage area corresponding to various operations performed in the electronic device 1300, a ROM that stores a control program for controlling peripheral devices, etc. The processor 1320 may be implemented as a system on chip (SoC) that integrates a core and a GPU. The processor 1320 may also include a plurality of processors.

In an embodiment, the processor 1320 executes a program stored in the memory 1310 to obtain a search path, obtain at least one video content related to the search path, determine an intersection point between the at least one video content, extract parts corresponding to the search path from the at least one video content by using the intersection pint, and stitch the extracted parts to generate video content of the search path. At this time, the video content may be 360 degree video content.

The processor 1320 may obtain video content acquired by photographing at least a part of the search path. Also, the processor 1320 may obtain photographing paths of the at least one video content and overlay the photographing paths of the at least one video content to determine the intersection point. At this time, the processor 1320 may calculate a motion of a camera by using a visual descriptor, obtain the photographing path based on the motion of the camera or based on additional information of the at least one video content including photographing positions.

The processor 1320 may extract intersection points located on the search path and parts corresponding to paths between the intersection points from the at least one video content. Further, the processor 1320 may select parts to be stitched based on context information of the extracted parts and may stitch the selected parts.

The electronic device 1300 may include additional configurations in addition to those shown in FIG. 13. This will be described with reference to FIG. 14.

Figure 14:
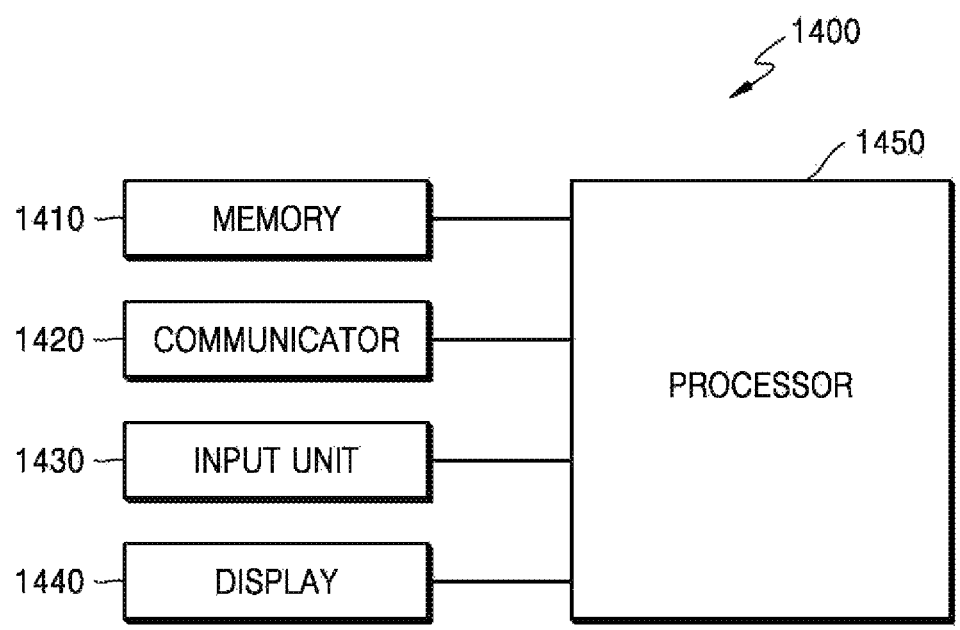
FIG. 14 illustrates a block diagram of a configuration of an electronic device according to another embodiment.

FIG. 14 illustrates a block diagram of a configuration of an electronic device 1400 according to another embodiment.

Referring to FIG. 14, the electronic device 1400 includes a memory 1410, a communicator 1420, an input unit 1430, a display 1440, and a processor 1450. The memory 1410 and the processor 1470 shown in FIG. 14 are the same configurations as the memory 1310 and the processor 1320 shown in FIG. 10, respectively.

The communicator 1420 may perform wired/wireless communication with another device or a network. To this end, the communicator 1420 may include a communication module supporting at least one of various wired/wireless communication methods. For example, the communication module may be in the form of a chipset. The communicator 1420 may be connected to an external device located outside the electronic device 1400 to transmit and receive signals or data. The electronic device 1400 may be connected to the external device through the communicator 1420 and transmit signals or data received from the external device to the processor 1450 or transmit signals or data generated by the processor 1450 to the external device. For example, the communicator 1420 may receive video content from the external device, or may transmit generated video content to the external device.

The input unit 1430 receives an input from a user. The input unit 1430 may include, for example, devices capable of receiving various types of a user input, such as, a keyboard, a physical button, a touch screen, a camera or a microphone but is not limited thereto. The input unit 1430 may include a device that supports various inputs.

In an embodiment, the input unit 1430 may receive an input with respect to a search path from the user.

The display 1440 may display information such as a result of performing an operation of the electronic device 1400 or a state of the electronic device 1400. The display 1440 may include at least one of a liquid crystal display, a thin film transistor-liquid crystal display, an organic light-emitting diode, a flexible display, a 3D display, and an electrophoretic display. The electronic device 1400 may include two or more displays 1440 according to an implementation of the electronic device 1400.

In an embodiment, the display 1440 may display video content that is generated by the processor 1450 and is used by the user.

The electronic device 1400 may further include other components not shown in FIGS. 13 and 14. For example, the electronic device 1400 may further include a camera to generate video content through photographing.

Meanwhile, the above-described embodiments may be embodied in the form of a non-transitory computer-readable recording medium storing computer-executable instructions and data. At least one of the instructions and the data may be stored in the form of a program code, and when executed by a processor, may generate a predetermined program module to perform a predetermined operation.

The non-transitory computer-readable recording medium may mean, for example, a magnetic storage medium such as a hard disk or the like, an optical reading medium such as a CD and a DVD, or the like, and may be a memory included in a server accessible via a network. For example, the non-transitory computer readable recording medium may be an electronic device or a memory of a server. Also, the non-transitory computer readable recording medium may be a memory included in a terminal, a server, or the like connected to an electronic device or a server via a network.

It should be understood that embodiments described herein should be considered in a descriptive sense only and not for purposes of limitation. Descriptions of features or aspects within each embodiment should typically be considered as available for other similar features or aspects in other embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating an electronic device, the method comprising:
receiving a user input to obtain a search path, wherein when the search path is located outdoors, the user input includes a departure and a destination and when the search path is located indoors the user input includes a building identifier or a floor number;
determining whether at least one video content from a plurality of video contents is related to the search path based on additional information associated with each of the plurality of video contents;

obtaining the at least one video content related to the search path;

after obtaining the at least one video content related to the search path, determining intersection points between the at least one video content and the search path;

extracting the intersection points and parts, wherein the intersection points are located on the search path and the parts correspond to paths between the intersection points from the at least one video content; and generating video content of the search path by stitching the extracted parts together, wherein generating the video content comprises:
selecting the parts to be stitched based on context information of the extracted parts; and
stitching the selected parts together.

2. The method of claim 1, wherein the determining of the intersection points between the at least one video content comprises:
obtaining photographing paths of the at least one video content; and
determining the intersection points by overlaying the photographing paths of the at least one video content.

3. The method of claim 2, wherein the obtaining of the photographing paths of the at least one video content comprises:
extracting a visual descriptor from the at least one video content;
calculating a motion of a camera by using the visual descriptor; and
obtaining the photographing paths based on the motion of the camera.

4. The method of claim 2, wherein the obtaining of the photographing paths of the at least one video content comprises obtaining the photographing paths based on the additional information of the at least one video content comprising a photographing position.

5. The method of claim 1, wherein the obtaining of the plurality of video contents comprises obtaining the plurality of video contents by photographing at least a portion of the search path.

6. The method of claim 1, wherein the plurality of video contents comprises 360 degree video content.

7. An electronic device comprising:
a memory configured to store a program for an operation of the electronic device; and
a processor coupled to the memory, the processor configured to:
receive a user input to obtain a search path, wherein when the search path is located outdoors, the user input includes a departure and a destination and when the search path is located indoors the user input includes a building identifier or a floor number,
determine whether at least one video content from a plurality of video contents is related to the search path based on additional information associated with each of the plurality of video contents;
obtain the at least one video content related to the search path,
after obtaining the at least one video content related to the search path, determine intersection points between the at least one video content and the search path,
extract the intersection points and parts, where the intersection points are located on the search path and the parts correspond to paths between the intersection points from the at least one video content, and
generate video content of the search path by stitching the extracted parts together by executing the program,
wherein the processor is further configured to:
select the parts to be stitched based on context information of the extracted parts, and
stitch the selected parts together.

8. The electronic device of claim 7, wherein the processor is further configured to:
obtain photographing paths of the at least one video content; and
determine the intersection points by overlaying the photographing paths of the at least one video content.

9. The electronic device of claim 8, wherein the processor is further configured to:
calculate a motion of a camera by using a visual descriptor; and
obtain the photographing paths based on the motion of the camera.

10. The electronic device of claim 8, wherein the processor is further configured to obtain the photographing paths based on the additional information of the at least one video content comprising a photographing position.

11. The electronic device of claim 7, wherein the processor is further configured to obtain the plurality of video contents by photographing at least a portion of the search path.

12. The electronic device of claim 7, wherein the plurality of video contents comprises 360 degree video content.

13. A non-transitory computer-readable medium embodying a computer program, the computer program comprising computer readable program code that, when executed by a processor, causes the processor to:
receive a user input to obtain a search path, wherein when the search path is located outdoors, the user input includes a departure and a destination and when the search path is located indoors the user input includes a building identifier or a floor number;
determine whether at least one video content from a plurality of video contents is related to the search path based on additional information associated with each of the plurality of video contents;
obtain the at least one video content related to the search path;
after obtaining the at least one video content related to the search path, determine intersection points between the at least one video content and the search path;
extract the intersection points and parts, wherein the intersection points are located on the search path and the parts correspond to paths between the intersection points from the at least one video content; and
generate video content of the search path by stitching the extracted parts together,
wherein the processor selects the parts to be stitched based on context information of the extracted parts and stitches the selected parts together.

14. The non-transitory computer-readable medium of claim 13, further comprising program code that, when executed by the processor, causes the processor to:
obtain photographing paths of the at least one video content; and
determine the intersection points by overlaying the photographing paths of the at least one video content.

15. The non-transitory computer-readable medium of claim 14, further comprising program code that, when executed by the processor, causes the processor to:
- calculate a motion of a camera by using a visual descriptor; and
- obtain the photographing paths based on the motion of the camera.

16. The non-transitory computer-readable medium of claim 14, further comprising program code that, when executed by the processor, causes the processor to obtain the photographing paths based on the additional information of the at least one video content including a photographing position.

17. The method of claim 1, further comprises:
- setting a region of interest (ROI) around the search path,
- wherein obtaining the plurality of video contents comprises obtaining the plurality of video contents based on the ROI that is around the search path.

18. The method of claim 1, wherein:
- the additional information that is associated with each of the plurality of video contents includes at least one of a title, photographing position information, a hash tag, index information, and summary information; and
- the context information of the extracted parts includes at least one of weather, season, time, and surrounding environment.

19. The electronic device of claim 7, wherein the processor is further configured to:
- set a region of interest (ROI) around the search path,
- wherein obtaining the plurality of video contents comprises obtaining the plurality of video contents based on the ROI that is around the search path.

20. The electronic device of claim 7, wherein:
- the additional information that is associated with each of the plurality of video contents includes at least one of a title, photographing position information, a hash tag, index information, and summary information; and
- the context information of the extracted parts includes at least one of weather, season, time, and surrounding environment.

* * * * *